(12) United States Patent
Chaudhuri et al.

(10) Patent No.: US 12,517,887 B2
(45) Date of Patent: Jan. 6, 2026

(54) PRIORITIZED DATA CLEANING

(71) Applicant: International Business Machines Corporation, Armonk, NY (US)

(72) Inventors: Ritwik Chaudhuri, Bangalore (IN); Sameep Mehta, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 879 days.

(21) Appl. No.: 17/546,346

(22) Filed: Dec. 9, 2021

(65) Prior Publication Data

US 2023/0185791 A1    Jun. 15, 2023

(51) Int. Cl.
*G06N 3/04*      (2023.01)
*G06F 16/22*     (2019.01)
*G06F 16/23*     (2019.01)

(52) U.S. Cl.
CPC ........ *G06F 16/2365* (2019.01); *G06F 16/221* (2019.01)

(58) Field of Classification Search
CPC ............... G06F 16/2365; G06F 16/221; G06F 16/215
See application file for complete search history.

(56) References Cited

U.S. PATENT DOCUMENTS

| | | | | |
|---|---|---|---|---|
| 7,228,239 | B1* | 6/2007 | Cetto | H01J 49/0036 436/171 |
| 7,814,056 | B2* | 10/2010 | McGrattan | G06F 11/1469 707/645 |
| 12,118,601 | B2* | 10/2024 | Luo | G06F 3/011 |
| 2014/0307958 | A1* | 10/2014 | Wang | G06F 18/214 382/159 |
| 2017/0017903 | A1* | 1/2017 | Gray | G06T 11/60 |
| 2017/0075918 | A1 | 3/2017 | Bates-Haus et al. | |

(Continued)

FOREIGN PATENT DOCUMENTS

| | | | | |
|---|---|---|---|---|
| CN | 102893327 A | * | 1/2013 | G06F 18/40 |
| CN | 109716345 A | * | 5/2019 | G06F 21/602 |

(Continued)

OTHER PUBLICATIONS

Mell, Peter, et al., The NIST Definition of Cloud Computing, National Institute of Standards and Technology, U.S. Department of Commerce, NIST Special Publication 800-145, Sep. 2011.

(Continued)

*Primary Examiner* — Hassan Mrabi
(74) *Attorney, Agent, or Firm* — Ryan, Mason & Lewis, LLP

(57) ABSTRACT

Methods, systems, and computer program products for prioritized data cleaning are provided herein. A computer-implemented method includes obtaining a dataset comprising a plurality of data issues; determining a priority of one or more features of the dataset; generating a respective model for each of a plurality of data resolution algorithms, wherein each model indicates computing costs of the corresponding data resolution algorithm for resolving at least portion of the plurality of data issues in an order of the priority of the features; and applying one or more of the plurality of data resolutions algorithm to resolve at least a portion of the data issues in the order of the priority of the features based at least in part on the generated models.

20 Claims, 8 Drawing Sheets

(56) References Cited

U.S. PATENT DOCUMENTS

| | | | |
|---|---|---|---|
| 2019/0286849 A1* | 9/2019 | Oberhofer | G06F 21/6254 |
| 2019/0304568 A1* | 10/2019 | Wei | G16B 15/20 |
| 2020/0089650 A1* | 3/2020 | Sharma | G06F 18/15 |
| 2020/0402625 A1* | 12/2020 | Aravamudan | G06F 21/6245 |
| 2021/0248268 A1* | 8/2021 | Ardhanari | G06F 21/53 |
| 2021/0349919 A1* | 11/2021 | Mandal | G06F 16/285 |
| 2022/0187841 A1* | 6/2022 | Ebrahimi Afrouzi | G05D 1/0274 |
| 2022/0358163 A1* | 11/2022 | Makhija | G06F 16/3344 |
| 2023/0153566 A1* | 5/2023 | Quader | G06F 16/215 706/20 |
| 2023/0296622 A1* | 9/2023 | Gaudilliere | G01N 33/74 436/510 |
| 2024/0029901 A1* | 1/2024 | Ezhov | G16H 10/60 |
| 2024/0273411 A1* | 8/2024 | Mueck | H04L 9/3263 |
| 2024/0310851 A1* | 9/2024 | Ebrahimi Afrouzi | A47L 9/2873 |

FOREIGN PATENT DOCUMENTS

| | | | | |
|---|---|---|---|---|
| CN | 110348624 B | * | 12/2020 | G06K 9/6268 |
| CN | 113468538 A | * | 10/2021 | G06F 18/214 |
| CN | 114219096 A | * | 3/2022 | G06N 3/08 |
| CN | 111339165 B | * | 6/2022 | G06F 16/2465 |
| CN | 110222416 B | * | 8/2022 | F22B 35/00 |
| CN | 111639065 B | * | 10/2022 | C30B 28/06 |
| CN | 111325410 B | * | 10/2023 | G06F 16/215 |
| CN | 110991518 B | * | 11/2023 | G06F 18/241 |
| CN | 112818195 B | * | 12/2023 | G06F 16/951 |
| EP | 3757889 A1 | * | 12/2020 | G06F 16/215 |
| WO | WO-2020016579 A2 | * | 1/2020 | G06N 10/20 |

OTHER PUBLICATIONS

Gu, Quanquan, et al., "Generalized fisher score for feature selection." arXiv preprint arXiv:1202.3725, Feb. 14, 2012.

Abedjan, Ziawasch, et al. "Detecting data errors: Where are we and what needs to be done?." Proceedings of the VLDB Endowment 9.12, Aug. 1, 2016.

Dilmegani, Cem, Data Cleaning in 2021: What it is, Steps to Clean Data & Tools, available at: https://research. aimultiple.com/data-cleaning/ (last accessed Aug. 16, 2021), Jan. 6, 2021.

"Process Mining Book: Detect and Fix Data Quality Problems", Fluxicon BV, available at: https://fluxicon.com/book/read/data-quality/, last accessed Dec. 9, 2021.

* cited by examiner

PRIORITIZED DATA CLEANING

BACKGROUND

The present application generally relates to information technology and, more particularly, to data optimization techniques.

Data cleaning generally refers to techniques that improve the quality of a dataset. For example, such techniques can include identifying incomplete, incorrect, inaccurate, or irrelevant parts of the dataset and replacing, modifying, or deleting those parts.

SUMMARY

In one embodiment of the present disclosure, techniques for prioritized data cleaning are provided. An exemplary computer-implemented method includes obtaining a dataset comprising a plurality of data issues; determining a priority of one or more features of the dataset; generating a respective model for each of a plurality of data resolution algorithms, wherein each model indicates computing costs of the corresponding data resolution algorithm for resolving at least portion of the plurality of data issues in an order of the priority of the features; and applying one or more of the plurality of data resolution algorithms to resolve at least a portion of the data issues in the order of the priority of the features based at least in part on the generated models.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

As described herein, an exemplary embodiment includes techniques to aid a user with cleaning a dataset. In some embodiments, candidate approaches can be presented so that the dataset can be cleaned in a computationally efficient manner. In one or more embodiments, input parameters can be collected from the user relating to the complexity of algorithms that are to be used for resolving issues in the dataset. In at least some embodiments, one or more default algorithms may be used on the dataset. Such embodiments may also include determining a set of prioritized features along with rankings and/or scores for the features. For example, features (such as columns in the dataset) can be considered important to the dataset based on a feature computation score (e.g., a Fisher score, Laplacian score, or ReliefF). The feature selection can also be made independent of the models. At least some embodiments include returning a profile (or plot) of the computing cost needed to resolve the data issues with respect to the data completion scores, based on the selected features. Additionally, a comparison of cost-completion profiles for a plurality of different processes can be output to the user, and the user can provide feedback on the cost-completing profiles, including a selection of a data resolution pathway to be followed. One or more embodiments can include automatically resolving the issues in the data based on the selected pathway. In some embodiments, multiple pathways may be selected based on the comparison of the profiles provided by the system. The features and/or weights can be provided by a user or can be automatically calculated. Optionally, the user can select one or more portions of the dataset that the user is interested in curating.

Figure 1:
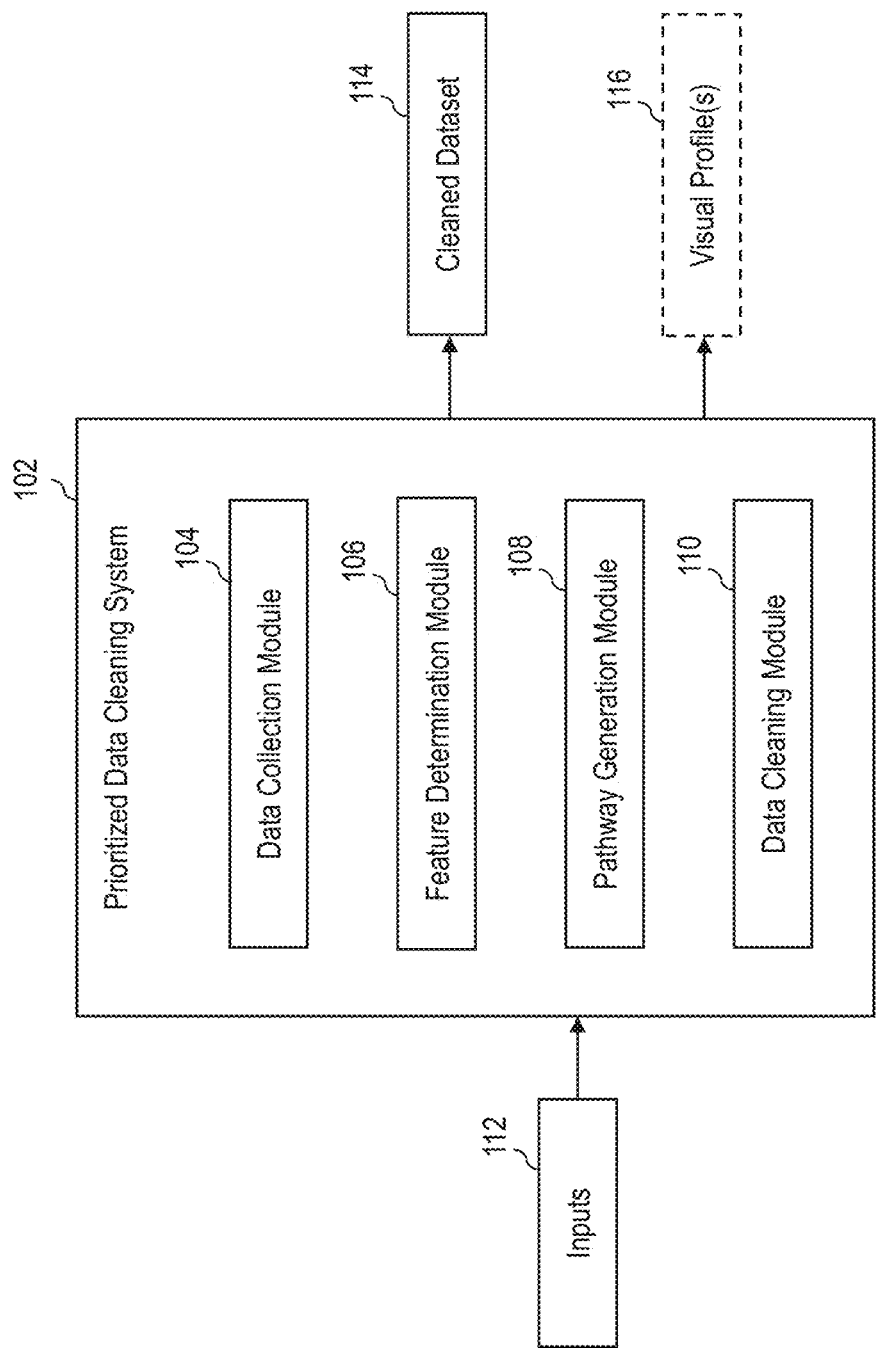
FIG. 1 is a diagram illustrating a system architecture in accordance with exemplary embodiments.

FIG. 1 is a diagram illustrating a system architecture in accordance with exemplary embodiments. By way of illustration, FIG. 1 depicts a prioritized data cleaning system 102 which includes a data collection module 104, a feature determination module 106, a pathway generation module 108, and a data cleaning module 110.

Generally, the prioritized data cleaning system 102 obtains a set of inputs 112 related to a dataset and outputs a cleaned dataset 114. More specifically, the set of inputs 112 can include, for example, one or more of (i) specific information on at least one algorithm to be used to curate one or more datasets, (ii) prioritized features of the one or more datasets, and (iii) one or more scores for the prioritized features.

The data collection module 104, in some embodiments, obtains the dataset to be cleaned. At least portions of the dataset can be uploaded by a user and/or collected from catalogs across one or more servers (not explicitly shown in FIG. 1).

The feature determination module 106, in some embodiments, can analyze the dataset to detect a set of prioritized features and corresponding scores. Optionally, at least a portion of the prioritized features and/or the scores can be provided by a user as part of the inputs 112.

The pathway generation module 108 determines one or more pathways to be used for cleaning the dataset, based at least in part on the prioritized features and the corresponding scores. In at least some embodiments, the pathway generation module 108 can generate and output visual profiles 116 of the different pathways. The data cleaning module 110 can apply one or more selected pathways to generate the cleaned dataset 114. Additional details of these and other features of the prioritized data cleaning system 102 are described in more detail elsewhere herein.

Existing data cleaning tools generally relate to address data issues, including, for example: formatting issues (e.g., format each column to the format of its majority class such as converting a string to an integer); outliers (e.g., delete apparent outliers or replace those with values); imputation (e.g., impute missing values with meaningful values); and de-duplication (removing duplicate entries). However, such tools can be inefficient as they fail to prioritize portions of data that should be cleaned to achieve a reasonable data completeness score while reducing computational costs.

Figures 2A, 2B:
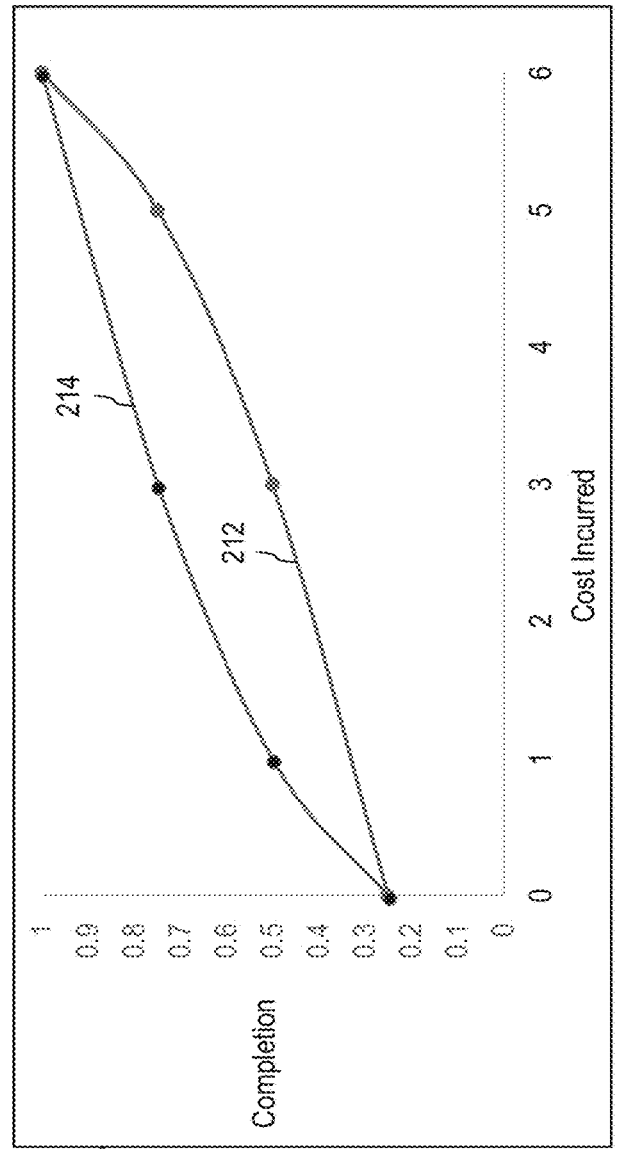
FIG. 2A is an example of a set of data that includes missing entries.
FIG. 2B is a chart illustrating computing costs for different schemes for cleansing the set of data in accordance with exemplary embodiments.

FIG. 2A shows an example of a table 200 and FIG. 2B shows a chart 210 illustrating computing costs for different schemes for cleaning the data in the table 200, in accordance with exemplary embodiments. Specifically, the table 200 includes four rows and four columns of data, where only one row is complete (i.e., row 202). Accordingly, a data completion score for table 200 is initially computed as 0.25. Additionally, the table 200 includes missing values which are to be completed with imputations. Assume for this example, that the cost to complete one missing value is one. A first scheme may include imputing missing values row by row, and a second scheme may include completing the data row by row in the following sequence: fourth row, second row, first row. FIG. 2B shows a chart 210 for the incurred cost and completion score for each of these schemes, where the first scheme corresponds to line 212 and the second scheme corresponds to line 214.

More generally, consider a dataset D with n rows, denoted by:

$$D = \begin{bmatrix} D_{COMPLETE} \\ D_{INCOMPLETE} \end{bmatrix},$$

where $D_{COMPLETE}$ has $n_1$ rows and $D_{INCOMPLETE}$ has $n_2$ rows such that $n_1+n_2=n$.

Assume that in the dataset D there are s types of data issues, and the operations for resolving each of such data issues is denoted by $[0_1, 0_2, \ldots 0_s]$ with computational cost $[c_1, c_2, \ldots, c_s]$, respectively. Now consider, for each $m \in \{1,2 \ldots, s\}$, the $(i,j)^{th}$ element of the matrix $O^m$ denoted by $O_{ij}^m=1$, if $(i, j)^{th}$ element of $D_{INCOMPLETE}$ has a data issue with operation $o_m$. Otherwise, the value of $O_{ij}^m=0$. We also define a computation cost matrix C where the $(i,j)^{th}$ element of C denotes the computation cost required to resolve the $(i,j)^{th}$ element of $D_{INCOMPLETE}$. Accordingly, C can be defined as $\Sigma_m^s=1 c_m O_m$.

Consider a model M which is used to measure the KPI (key performance indicator such as accuracy, minimum cost, or completion profile) on the curated data. In such a case, the main goal is, given a cost of data cleaning denoted by c, what portions of incomplete data should be curated so that the $M^{KPI}(D)$ is maximized.

Also, consider a vector $p_r=\{a_1, a_2, \ldots a_{n_2}\}$, where r of $a_1$, $a_2, \ldots a_{n_2}$ are 1 and the rest are 0, and the class of vectors $P_r$ which comprises of all vectors of the form $p_r$. The size of $P_r$ is $\binom{n_2}{r}$. The class of vectors is defined as $P_{ROW}=U_{r=1}^{n_2}P_r$. Also, consider a vector $q_r=\{a_1, a_2, \ldots, a_d\}$ where r of $a_1$, $a_2, \ldots, a_d$ are 1 and the rest are 0, and the class of vectors $Q_r$ which comprises vectors of the form $q_r$. The size of $Q_r$ is $\binom{d}{r}$, and the class of vectors can be defined as $Q_{COLUMN}=U_{r=1}^{d}Q_r$.

Thus, the problem can generally be expressed as:

$$\max\{M^{KPI}(D^*)|Diag(p) \times C \times Diag(q) \leq c, p \in P_{ROW}, q \in Q_{COLUMN}\}$$

$$\text{where, } D^* = \begin{bmatrix} D_{COMPLETE} \\ Diag(p) \times D_{INCOMPLETE} \times Diag(q) \end{bmatrix}$$

If the KPI being considered is accuracy, then an equivalent problem is to maximize the Fisher Score in the truncated data, that is:

$$\max\{F(D^*)|Diag(p) \times C \times Diag(q) \leq c, p \in P_{ROW}, q \in Q_{COLUMN}\}.$$

One or more embodiments described herein include obtaining inputs (e.g., corresponding to inputs 112) that specify information pertaining to algorithms to be used to curate the data and important features of the dataset. The following table shows some input parameters that can be used in such embodiments:

TABLE 1

| Parameters | Values |
|---|---|
| Complexity of algorithm for outlier detection | Default value or user specified |
| Complexity of algorithm for formatting issue resolution | Default value or user specified |
| Complexity of algorithm for imputation | Default value or user specified |
| Complexity of algorithm for other data issue resolution method | Default value or user specified |
| Feature importance/priority | User specified or to be computed by user |
| Features scores | User specified or to be computed by user |
| Data portion where the user might want to curate | User specified or to be computed by user |

By way of example, the importance of the features, in at least some embodiments, can be categorized as high, medium, and low. If the important features and the feature scores are included in the input parameters, then those can be directly used in an optimization process (as described in more detail below). Also, in one or more embodiments, the following process can be performed (e.g., by feature determination module 106) to determine the prioritized features and scores, such as when they are not provided by the user. Consider a dataset $$D = \begin{bmatrix} D_{Complete} \\ D_{Incomplete} \end{bmatrix}$$

with c classes then:

$F(D)=tr\{S_b(S_t+\gamma I)^{-1}\}$, where:

$$S_b = \sum_{k=1:\ c} n_k(\mu_k - \mu)(\mu_k - \mu)^T$$

$$S_t = \sum_{i=1:\ n_1} (d_i - \mu)(d_i - \mu)^T,$$

where, $\mu_k$ is the vector of means of all the columns in dataset $D=(d_1, \ldots, d_n)$ belonging to class k.

Features labeled as "high" priority are defined as: $D_{High}|\max F(D_{High})$, $D_{High} \subseteq D_{Complete}$, where $F(D_{High})$ are the scores of high priority features. Medium priority can be defined as: $D_{medium}|\max F(D_{Medium})$, $D_{Medium} \subseteq D_{Complete} \backslash D_{High}$, where $F(D_{Medium})$ are the scores of medium priority features; and the low priority features correspond to the remaining features in the dataset, where $F(D_{Low})$ corresponds to the low feature scores.

Now assume that $D_{High}$, $D_{Medium}$, $D_{Low}$ and $F(D_{High})$, $F(D_{medium})$, $F(D_{Low})$, each algorithm complexity, and the portion of data $D_0 \subseteq D_{Incomplete}$ on which the data is to be curated have all been obtained. One or more embodiments include performing the following steps:

1. Form a cost vector of the n algorithms for curating the data given by $C=[c_1, c_2, \ldots, c_n]$;
2. For each priority category (e.g., high, medium, and low), compute priority final score as priority score multiple by the proportion of rows with issues in the respective priority category; and
3. Resolve issues by (a) choosing the category with the maximum priority final score and resolve issues in that category for a specified R number of rows with minimum cost (where R can be a default vale, or specified by a user), and (b) re-compute the priority final score and repeat step 2 until all issues are resolved.

Figure 3:
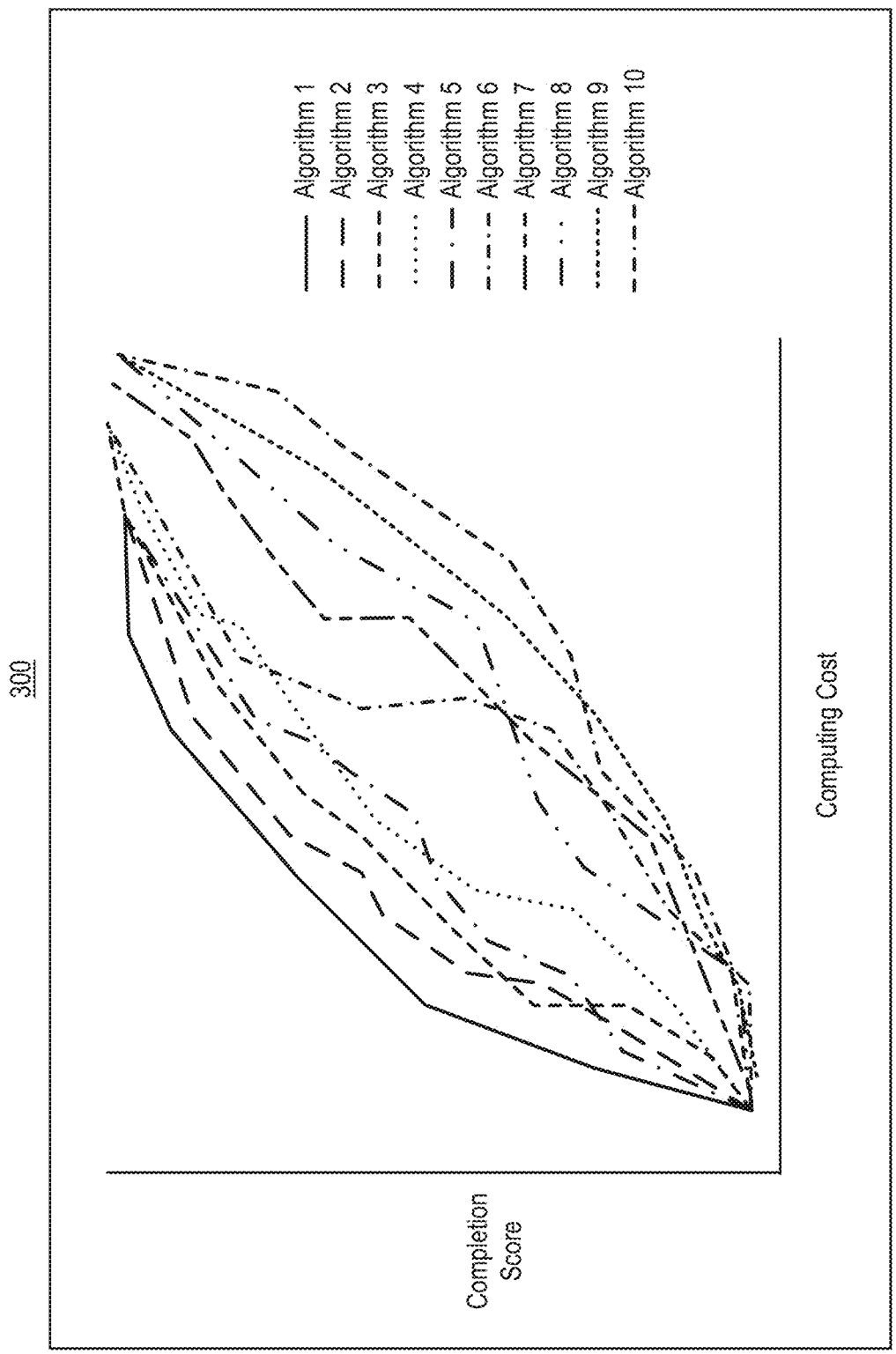
FIG. 3 is an example of a visual representation showing different data cleansing pathways in accordance with exemplary embodiments.

Some embodiments include presenting a user with a comparison of cost-completeness profiles (e.g., in the form of visual profiles 116, for example) of different data resolution methods so that the user can select the appropriate one. FIG. 3 is one example of a chart 300 showing visual profiles representing different data pathways in accordance with exemplary embodiments. In this example, each profile corresponds to a different algorithm (i.e., algorithms 1-10). Each of the algorithms is shown on the chart 300 with respect to its computing cost and completion score.

Some examples of algorithms that correspond to the profiles (which do not consider hierarchy of categories) can include one or more of the following:

Random Resolution Algorithm—If the data issues were chosen to be resolved on a random basis, the profile indicate how much computation cost be incurred for different completion scores.

Sequential Resolution Algorithm—If data issues were sequentially chosen starting from row one.

Greedy Best Resolution Algorithm—Greedily resolved the data issues starting from the ones which are most costly but occurring the least number of times and proceeded in such a sequence.

Greedy Worst Resolution Algorithm—Greedily resolved the data issues starting from the ones which are most costly and occurring most of the number of times and proceeded in such a sequence.

Optimized Resolution Algorithm—A cost-optimized data resolution technique where the system comes decides the best possible data resolution pathway.

Some examples of algorithms that are based on the hierarchy of categories include one or more of the following:

Hierarchy Random Resolution Algorithm—Resolve the data issues based on the priority of categories;

Hierarchy Sequential Resolution Algorithm—Sequentially choose to resolve the data issues starting from row one based on the priority of categories;

Hierarchy Greedy Best Resolution Algorithm—Greedily resolve the data issues starting from the ones which are most costly based on the priority categories but occurring the least number of times and proceeding in such a sequence.

Hierarchy Greedy Worst Resolution Algorithm—Greedily resolve the data issues starting from the ones which are most costly based on the priority categories and occurring the most number of times, and proceeding in such a sequence.

Hierarchy System Proposed Resolution Algorithm—Cost optimized data resolution technique that considers the priority categories where the system produces the best possible data resolution pathway.

It is noted that an effective completeness score can be computed, for example, as: high priority score x proportion of rows filled in high priority category+medium priority score x proportion of rows filled in medium priority category+low priority score x proportion of rows filled in low priority category)/(high priority score +medium priority score+low priority score).

In some embodiments, a user may select any of the data resolution techniques (corresponding to algorithms 1-10) or may choose multiple combinations of the resolution techniques to resolve the issues in the data. Additionally, in some embodiments a user may choose to provide further input prior to making a final selection. In such embodiments, additional charts can be displayed to the user, such as: cost vs. completeness score, where the chart shows the portion of the dataset that is complete and how much cost is incurred to reach given completeness scores; and cost vs. high priority completeness score, where the chart shows the high importance portion of the data that is complete and how much cost is incurred to reach such a completeness score. Similar charts can also be shown for medium and low priority, or combinations of different priorities, for example.

Figure 4:
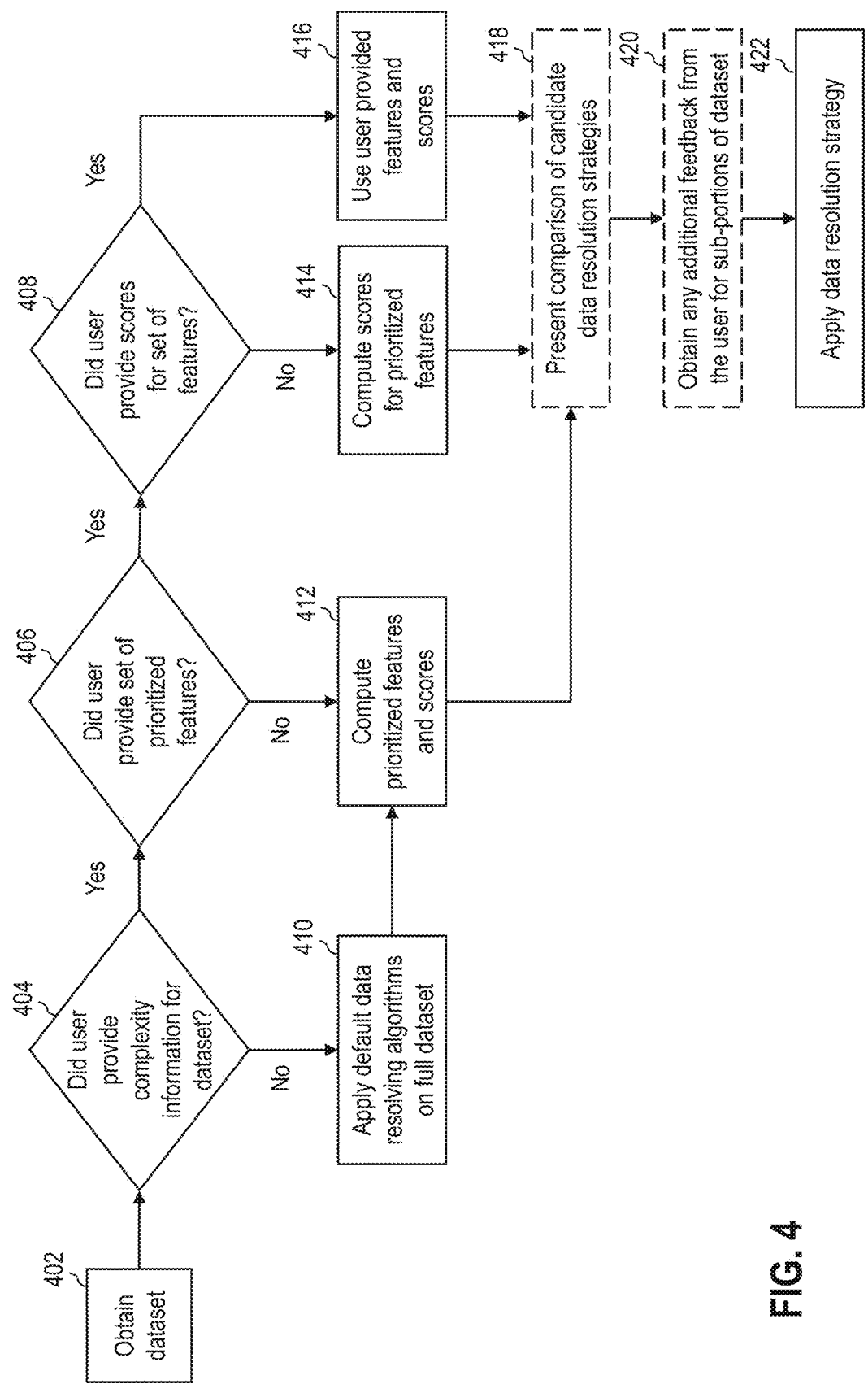
FIG. 4 is a diagram illustrating a process flow diagram in accordance with exemplary embodiments.

FIG. 4 is a diagram illustrating a process flow diagram in accordance with exemplary embodiments. Step 402 includes obtaining a dataset (e.g., including data that needs to be cleaned). Step 404 includes checking whether the user provided any complexity information to be used for algorithms (as shown in Table 1, for example). If no, then step 410 includes applying a set of default data resolving algorithms on the entire dataset. If yes, then the process continues to step 406.

Step 406 includes checking whether the user provided a set of prioritized features in the dataset. If no, then step 412 includes computing the prioritized features, and also the scores for such features. If yes, then the process continues to step 408.

Step 408 includes checking whether the user provided scores for any of the prioritized features in the dataset. If no, then the step 414 includes computing the scores for the prioritized features. If yes, then the step 416 includes using the user provided scores and features.

Optionally, step 418 includes presenting one or more comparisons of the candidate data resolution strategies to the user; and step 420 optionally includes obtaining additional feedback from the user for sub-portions of the dataset. Step 422 includes applying one or more of the data resolution strategies to the dataset.

The process depicted in FIG. 4 can be adapted to apply to different scenarios. For example, in a simple setup, a user may upload a dataset and the system can provide different cost-completion profiling of data for cleaning the dataset. Centralized approaches are also possible. For example, in a centralized setup, portions of the dataset can be spread over different servers/nodes. In this situation, the portions can be joined to form a single dataset which is used in to perform the cost-completion profiling process depicted in FIG. 4, for example. Also, in a centralized hybrid setup, a portion of the dataset can be stored across one or more online data catalogs, and then the user may upload another portion of the dataset (e.g., which could include new rows of data). In such a scenario, the two datasets can be appended into a single dataset, which is then used to perform the cost-completion profiling process.

Decentralized approached are also possible. For example, a decentralized hybrid setup can include a user uploading a portion of a dataset (possibly including new rows), and other portions of the dataset are stored on one or more catalogs. For this case, it is assumed the datasets cannot be appended together to form one single dataset due to space/security constraints. Thus, in at least some embodiments, a weighted Fisher score is computed using the following equation: $F(D)=tr\{n_1 S_b^1 (n_1 S_t^1+\gamma_1 I)^{-1}+n_2 S_b^2(n_1 S_t^2+\gamma_2 I)^{-1}\}$ where $S_b^1$ and $S_b^2$ are the between variance computed on the same set of columns, one with the user uploaded portion of data and the other one with the data in the catalog. Similarly, $S_t^1$ and $S_t^2$ are the total variances respectively computed for the user uploaded data and the catalog data. It is noted that $n_1$ and $n_2$ corresponds to the number of rows in user uploaded data and the catalog data, respectively. Accordingly, the dataset can be divided into different categories, and the cost-completion profiling process can be performed.

A decentralized setup is also possible, where different datasets are spread across different servers/nodes, which cannot be joined/appended to form a single dataset (e.g., due to space/security constraints). If the user does not provide complexity information at step 404, then the process can include an additional step to determine whether additional rows are provided for the same column headers. If yes, then the process can also include a step to compute the features and scores if additional rows are provided for the same column headers. Since the data cannot be appended, this can be done using weighted Fisher Scores where the size of the subset of data is used as weight in the Fisher Score computation. Also, if a dataset on a particular server includes additional columns available for the dataset, then the priority features can be computed based on these additional rows using a Fisher score. Hence, for any server where additional columns are available, a Fisher score for the portions of data with different priorities (e.g., high, medium, low) can be computed. The process can then recursively compute data issues in which server the data is to be curated at a given point in time, and which sections (e.g., high, medium, or low) of the data are to be curated along with the portion of data where it is to be curated. Corresponding rows can be curated in the portions of the data residing in other nodes.

Figure 5:
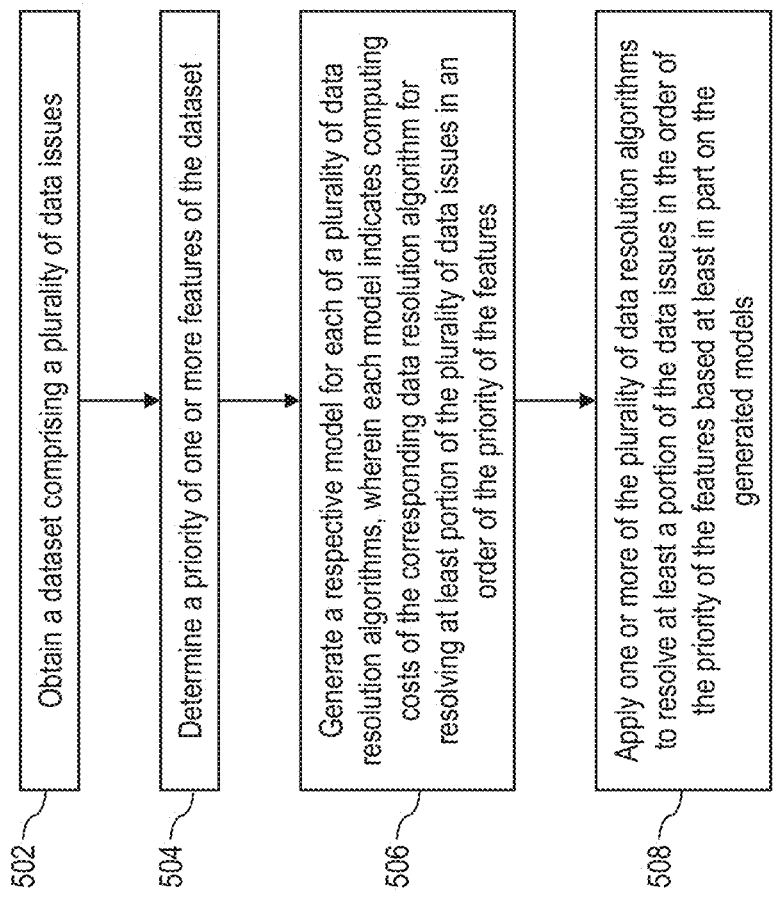
FIG. 5 is a flow diagram illustrating techniques for prioritized data cleaning in accordance with exemplary embodiments.

FIG. 5 is a flow diagram illustrating techniques in accordance with exemplary embodiments. Step 502 includes obtaining a dataset comprising a plurality of data issues. Step 504 includes determining a priority of one or more features of the dataset. Step 506 includes generating a respective model for each of a plurality of data resolution algorithms, wherein each model indicates computing costs of the corresponding data resolution algorithm for resolving at least portion of the plurality of data issues in an order of the priority of the features. Step 508 includes applying one or more of the plurality of data resolution algorithms to resolve at least a portion of the data issues in the order of the priority of the features based at least in part on the generated models.

The process may include the following steps: outputting visual representations of one or more of the generated models to a user; and obtaining user input that indicates at least one of the plurality of data resolution algorithms to apply to the dataset. The user input may comprise a selection of at least two of the plurality of data resolution algorithms to be applied to different portions of the dataset. The one or more features may correspond to one or more columns in the dataset. The priority may be based on user input provided by a user, the user input comprising at least one of: at least a portion of the one or more features; and one or more scores specified for at least a portion of the one or more features. The determining may be based at least in part on one or more unsupervised machine learning techniques. The determining may include applying at least one of: a ReliefF process, a F-score process, and a Laplacian score process. The process may include a step of obtaining complexity information for at least a portion of the plurality of data resolution algorithms, wherein the complexity information corresponds to one or more types of the data issues. The one or more types of data issues may correspond to at least one of: one or more outliers in the dataset, one or more imputations in the dataset, and one or more formatting issues in the dataset. At least a portion of the dataset may include at least one of: user uploaded data; and data from one or more online data catalogs. The data from the one or more online data catalogs may be stored across a plurality of servers, and the priority of the features may be based at least in part on a weighted Fisher score computation. A first portion of the dataset may include data uploaded by the user and a second portion of the dataset may include data from one or more online data catalogs, and the priority of features may be determined for at least one of: one or more subsets of the first portion and one or more subsets of the second portion. The obtaining may include combining user uploaded data with data from one or more online data sources. The determining may be based at least in part on a Fisher score computation that is performed in response to determining that different portions of the dataset cannot be combined.

The techniques depicted in FIG. 5 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 6:
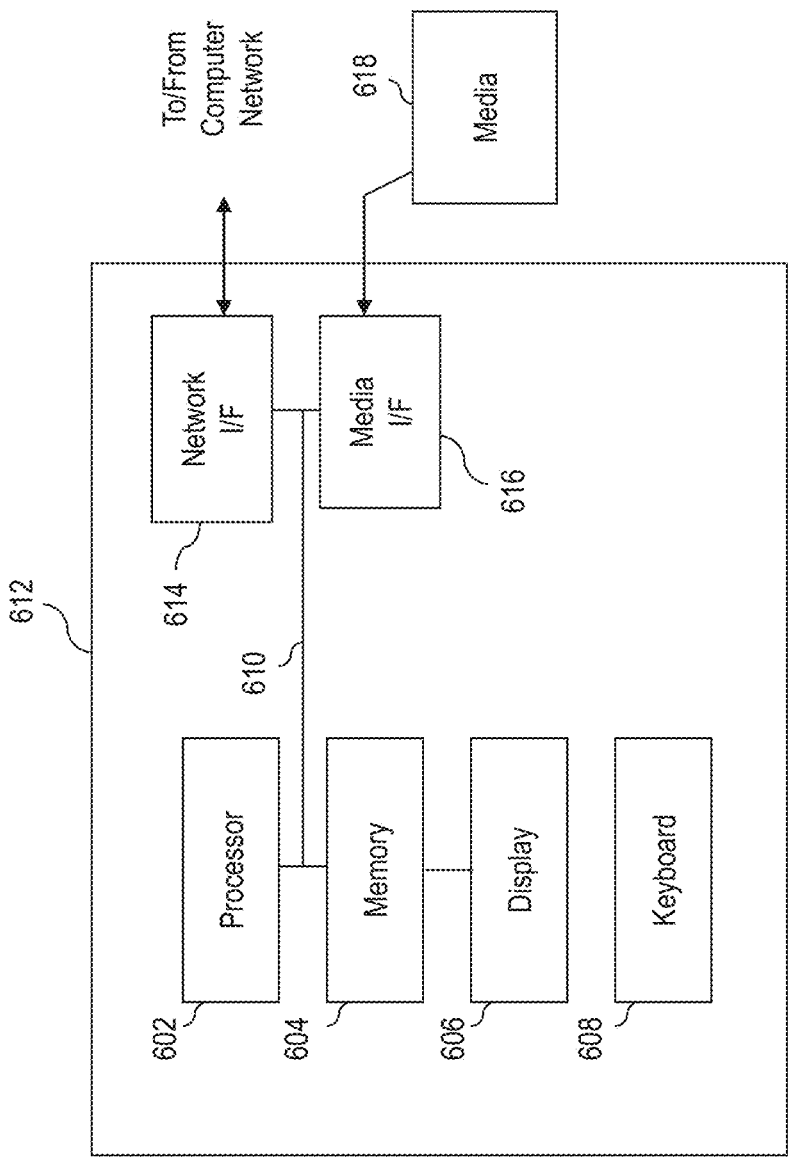
FIG. 6 is a system diagram of an exemplary computer system on which at least one embodiment of the present disclosure can be implemented.

Additionally, an embodiment of the present disclosure can make use of software running on a computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
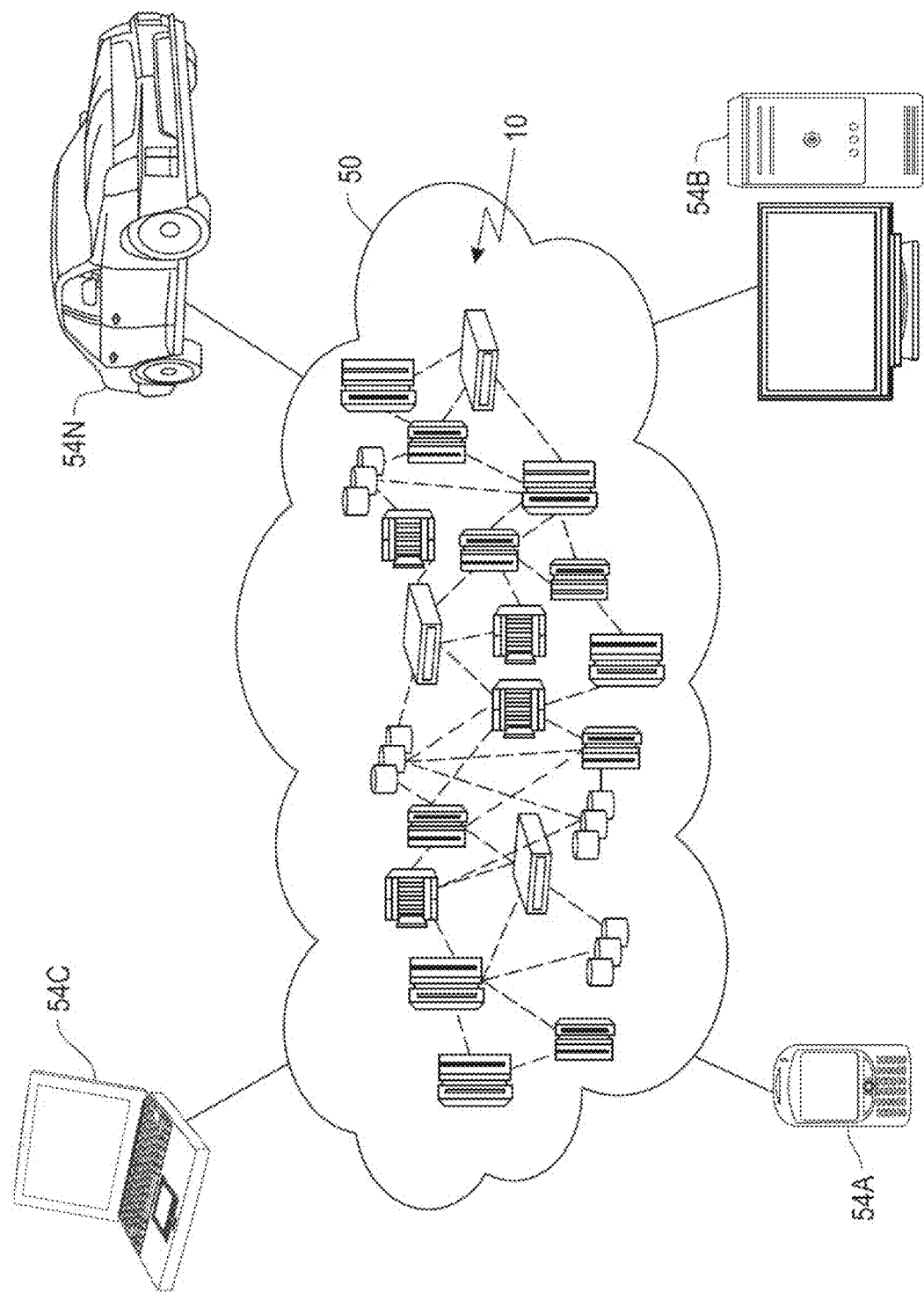
FIG. 7 depicts a cloud computing environment in accordance with exemplary embodiments.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
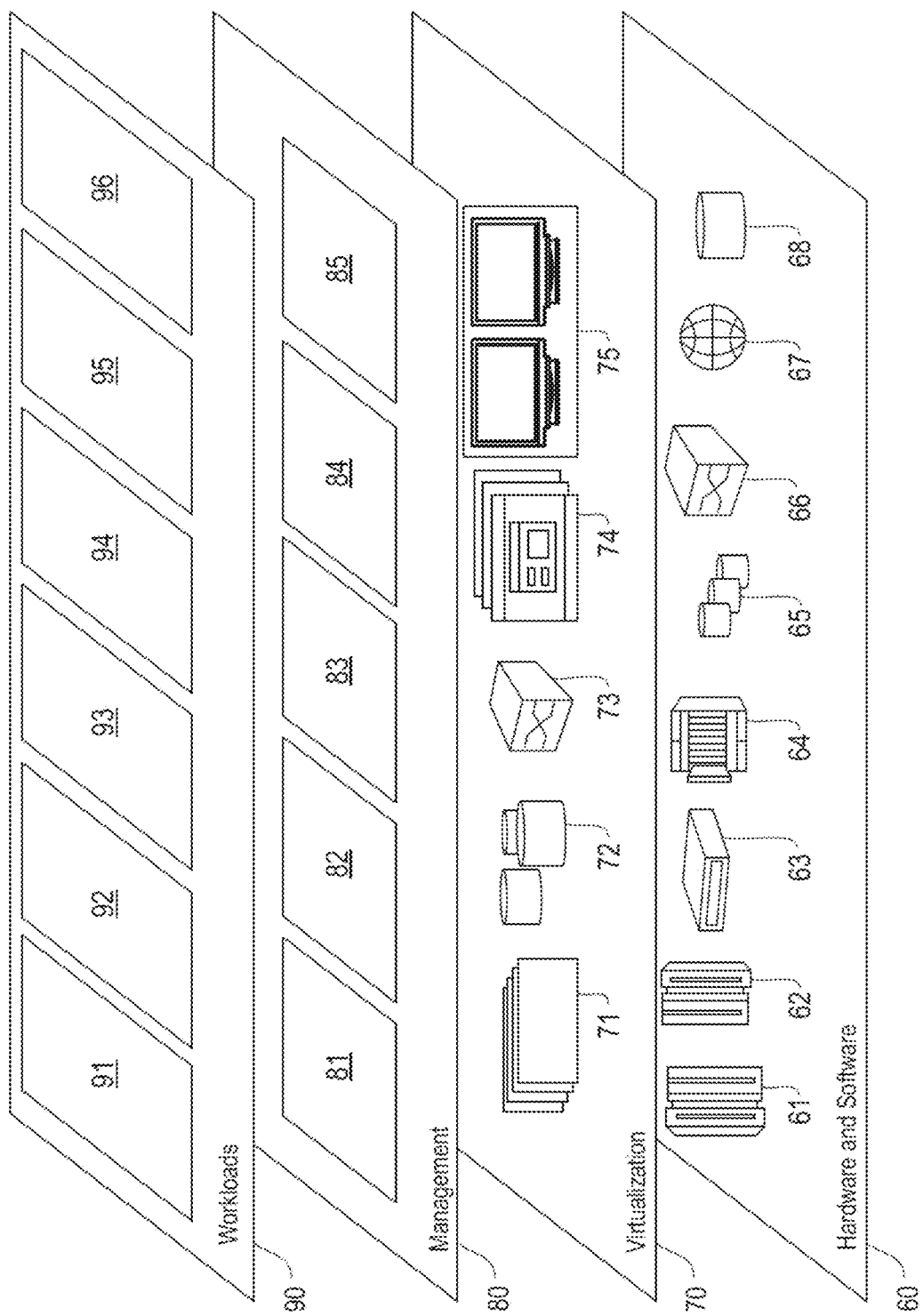
FIG. 8 depicts abstraction model layers in accordance with exemplary embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and prioritized data cleaning 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, improvements to data cleaning tools that can automatically determine a data cleaning pathway that is optimized for computation costs. Additionally, some embodiments can allow a user to compare computational costs of multiple different cleaning pathways, and selectively apply one or more pathways to different portions of a dataset.

Accordingly, in situations where data is spread across multiple servers and/or nodes, at least one embodiment may determine what portions of data from which server should be curated in a prioritized manner and provide a computational cost comparison across multiple algorithms for following such a data cleaning pathway scattered over the multiple servers and/or nodes. Also, in situations where a portion of an existing dataset is stored in a catalog, and the user uploads a new portion of the existing dataset (e.g., one or more new columns), one or more embodiments described herein can determine prioritize what portions of data are to be curated and provide a computation cost comparison across different algorithms for following such a pathway.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
    obtaining a dataset comprising a plurality of data issues;
    determining a priority of one or more features of the dataset;
    generating a respective model for each of a plurality of data resolution algorithms, wherein each model indicates, for the corresponding data resolution algorithm, a relationship between a predicted computing cost and a data completion score for resolving at least a portion of the plurality of data issues in an order of the priority of the one or more features;
    automatically selecting, based on the generated models, two or more of the data resolution algorithms to be applied to different portions of the dataset, wherein the selecting is based on an improvement objective that defines a computing cost constraint and/or a target data completion score; and
    modifying the dataset by applying the selected two or more of the plurality of data resolution algorithms, wherein the modified dataset resolves at least a portion of the data issues in the order of the priority of the features;
    wherein the method is carried out by at least one computing device.

2. The computer-implemented method of claim 1, comprising:
    outputting visual representations of one or more of the generated models to a user, wherein the two or more of the data resolution algorithms to be applied to different portions of the dataset are selected further based on a user selection associated with at least one of the plurality of data resolution algorithms.

3. The computer-implemented method of claim 1, wherein the one or more features correspond to one or more columns in the dataset.

4. The computer-implemented method of claim 1, wherein the priority is based on user input provided by a user, the user input comprising at least one of:
    at least a portion of the one or more features; and
    one or more scores specified for at least a portion of the one or more features.

5. The computer-implemented method of claim 1, wherein the determining is based at least in part on one or more unsupervised machine learning techniques.

6. The computer-implemented method of claim 1, wherein the determining comprises applying at least one of: a ReliefF process, a F-score process, and a Laplacian score process.

7. The computer-implemented method of claim 1, comprising:
    obtaining complexity information for at least a portion of the plurality of data resolution algorithms, wherein the complexity information corresponds to one or more types of the data issues, the one or more types of data issues corresponding to at least one of: one or more outliers in the dataset, one or more imputations in the dataset, and one or more formatting issues in the dataset.

8. The computer-implemented method of claim 1, wherein at least a portion of the dataset comprises at least one of:
    user uploaded data; and
    data from one or more online data catalogs.

9. The computer-implemented method of claim 8, wherein the data from the one or more online data catalogs is stored across a plurality of servers, and wherein the priority of the features is based at least in part on a weighted Fisher score computation.

10. The computer-implemented method of claim 1, wherein a first portion of the dataset comprises data uploaded by a user and a second portion of the dataset comprises data from one or more online data catalogs, and wherein the priority of features is determined for at least one of: one or more subsets of the first portion and one or more subsets of the second portion.

11. The computer-implemented method of claim 1, wherein the obtaining comprises:
    combining user uploaded data with data from one or more online data sources.

12. The computer-implemented method of claim 1, wherein the determining is based at least in part on a Fisher score computation that is performed in response to determining that different portions of the dataset cannot be combined.

13. A computer program product comprising a computer readable storage medium having program instructions embodied therewith, the program instructions executable by a computing device to cause the computing device to:
    obtain a dataset comprising a plurality of data issues;
    determine a priority of one or more features of the dataset;
    generate a respective model for each of a plurality of data resolution algorithms, wherein each model indicates, for the corresponding data resolution algorithm, a relationship between a predicted computing cost and a data completion score for resolving at least a portion of the plurality of data issues in an order of the priority of the one or more features;
    automatically select, based on the generated models, two or more of the data resolution algorithms to be applied to different portions of the dataset, wherein the selecting is based on an improvement objective that defines a computing cost constraint and/or a target data completion score; and modify the dataset by applying the selected two or more of the plurality of data resolution algorithms, wherein the modified dataset resolves at least a portion of the data issues in the order of the priority of the features.

14. The computer program product of claim 13, wherein the program instructions executable by a computing device further cause the computing device to:

output outputting visual representations of one or more of the generated models to a user, wherein the two or more of the data resolution algorithms to be applied to different portions of the dataset are selected further based on a user selection associated with at least one of the plurality of data resolution algorithms.

15. The computer program product of claim 13, wherein the one or more features correspond to one or more columns in the dataset.

16. The computer program product of claim 13, wherein the priority is based on user input provided by a user, the user input comprising at least one of:

at least a portion of the one or more features; and
one or more scores specified for at least a portion of the one or more features.

17. A system comprising:

a memory configured to store program instructions;
a processor operatively coupled to the memory to execute the program instructions to:
obtain a dataset comprising a plurality of data issues;
determine a priority of one or more features of the dataset;
generate a respective model for each of a plurality of data resolution algorithms, wherein each model indicates, for the corresponding data resolution algorithm, a relationship between a predicted computing cost and a data completion score for resolving at least a portion of the plurality of data issues in an order of the priority of the one or more features;

automatically select, based on the generated models, two or more of the data resolution algorithms to be applied to different portions of the dataset, wherein the selecting is based on an improvement objective that defines a computing cost constraint and/or a target data completion score; and modify the dataset by applying the selected two or more of the plurality of data resolution algorithms, wherein the modified dataset resolves at least a portion of the data issues in the order of the priority of the features.

18. The computer-implemented method of claim 1, wherein the improvement objective comprises at least one of reducing the predicted computing cost to achieve the target data completion score and increasing the data completion score subject to the computational cost constraint.

19. The computer-implemented method of claim 1, wherein the obtained dataset is stored as a plurality of separate portions across different servers that cannot be combined due to security and/or computing constraints, and wherein generating the respective models and modifying the dataset are performed without joining the plurality of separate portions into a single dataset.

20. The computer-implemented method of claim 1, wherein generating the respective model for each of the plurality of data resolution algorithms comprises generating a cost-completeness profile, wherein the cost-completeness profile comprises a data structure that maps a plurality of data completion scores to a corresponding plurality of predicted computing costs for a specific data resolution algorithm.

* * * * *